(12) United States Patent
Brandvold et al.

(10) Patent No.: US 8,546,635 B1
(45) Date of Patent: Oct. 1, 2013

(54) METHODS AND APPARATUSES FOR PREPARING UPGRADED PYROLYSIS OIL

(75) Inventors: Timothy A. Brandvold, Arlington Heights, IL (US); Lance Awender Baird, Prospect Heights, IL (US); Stanley Joseph Frey, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/439,708

(22) Filed: Apr. 4, 2012

(51) Int. Cl.
*C07C 1/20* (2006.01)

(52) U.S. Cl.
USPC ........... 585/639; 585/240; 585/324; 585/640; 44/605

(58) Field of Classification Search
None
See application file for complete search history.

(56) References Cited

U.S. PATENT DOCUMENTS

| 3,392,107 A | 7/1968 | Pfefferle et al. |
| 7,511,181 B2 | 3/2009 | Petri et al. |
| 2010/0076238 A1 | 3/2010 | Brandvold et al. |
| 2011/0105813 A1 | 5/2011 | Roberts, IV et al. |
| 2011/0146135 A1 | 6/2011 | Brandvold |
| 2011/0146141 A1 | 6/2011 | Frey et al. |
| 2011/0146145 A1 | 6/2011 | Brandvold et al. |
| 2011/0313219 A1 | 12/2011 | Fernando et al. |

FOREIGN PATENT DOCUMENTS

| WO | 2010124030 A1 | 10/2010 |
| WO | 2011115394 A2 | 9/2011 |

OTHER PUBLICATIONS

Mullen, C., et al., "Catalytic fast pyrolysis of white oak wood in a bubbling fluidized bed," Energy and Fuels, vol. 25, No. 11, pp. 5444-5451; Nov. 17, 2011.
Frey, S., et al, "Methods and Apparatuses for Forming Low-Metal Biomass-Derived Pyrolysis Oil," U.S. Appl. No. 13/162,188, filed Jun. 16, 2011.
Baird, L., et al., "Methods for Deoxygenating Biomass Derived Pyrolysis Oil," U.S. Appl. No. 13/326,050, filed Dec. 14, 2011.
Hashimoto, A., "Catalytic Reforming of Naphtha and Its Application to Aromatics Production-3. Reforming of Pyrolytic Gasoline," Sekiyu Gakkai Shi vol. 13 No. 6, pp. 458-461; Jun. 1970.

*Primary Examiner* — Tam M Nguyen
(74) *Attorney, Agent, or Firm* — David J Piasecki

(57) ABSTRACT

Methods and apparatuses for preparing upgraded pyrolysis oil are provided herein. In an embodiment, a method of preparing upgraded pyrolysis oil includes providing a biomass-derived pyrolysis oil stream having an original oxygen content. The biomass-derived pyrolysis oil stream is hydrodeoxygenated under catalysis in the presence of hydrogen to form a hydrodeoxygenated pyrolysis oil stream comprising a cyclic paraffin component. At least a portion of the hydrodeoxygenated pyrolysis oil stream is dehydrogenated under catalysis to form the upgraded pyrolysis oil.

19 Claims, 2 Drawing Sheets

METHODS AND APPARATUSES FOR PREPARING UPGRADED PYROLYSIS OIL

STATEMENT REGARDING FEDERALLY SPONSORED RESEARCH OR DEVELOPMENT

This invention was made with government support under Award No. DE-EE0002879 awarded by United States Department of Energy. The Government has certain rights in this invention.

TECHNICAL FIELD

The present invention generally relates to methods and apparatuses for preparing upgraded pyrolysis oil, and more particularly relates to methods and apparatuses for minimizing degradation in fuel value of upgraded pyrolysis oil that results from conventional hydrodeoxygenation techniques.

BACKGROUND

Growth of world energy demand has prompted widespread research and development to identify alternative energy sources for satisfying such demand. One such promising alternative energy source is biofuel, which encompasses various types of combustible fuels that are derived from organic biomass. There is a strong desire to develop biofuels that are not only cost-competitive with fossil fuels but also offer environmental benefits and are renewable. One particular type of biofuel is biomass-derived pyrolysis oil. Biomass-derived pyrolysis oil can be burned directly as fuel for certain boiler and furnace applications. Biomass-derived pyrolysis oil can also serve as a potential feedstock in catalytic processes for the production of fuel in petroleum refineries. Biomass-derived pyrolysis oil has the potential to replace up to 60% of transportation fuels, thereby reducing the dependency on conventional fossil fuel and reducing its environmental impact.

Biomass-derived pyrolysis oil is produced through pyrolysis, including through recently-developed fast pyrolysis processes. Fast pyrolysis is a process during which organic biomass, such as wood waste, agricultural waste, etc., are rapidly heated to about 450° C. to about 600° C. in the absence of air using a pyrolysis reactor. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system to produce a biomass-derived pyrolysis oil stream. Biomass-derived pyrolysis oil is a complex, highly oxygenated organic liquid that typically contains about 20-30% by weight water with high acidity (TAN>150).

The biomass-derived pyrolysis oil stream often has a high content of heteroatoms, such as sulfur, nitrogen, and oxygen, the removal of which can upgrade the fuel value of the biomass-derived pyrolysis oil stream. Oxygen is often present in the biomass-derived pyrolysis oil stream in the form of aromatic oxygenates. The oxygen can be removed from the biomass-derived pyrolysis oil stream through hydrodeoxygenation with hydrogen in the presence of a hydrodeoxygenation catalyst to form a hydrodeoxygenated pyrolysis oil stream. Hydrodeoxygenation cleaves the oxygen bond to the aromatic ring of the aromatic oxygenates. However, during hydrodeoxygenation, the aromatic ring of the aromatic oxygenates are converted to a naphthene intermediate, i.e., a cyclic paraffin, to allow for cleavage of the oxygen bond to the aromatic ring. The naphthene intermediate generally remains in the hydrodeoxygenated pyrolysis oil stream after hydrodeoxygenation. Unfortunately, the naphthene intermediate has low octane quality and degrades the fuel value of the hydrodeoxygenated pyrolysis oil stream.

Accordingly, it is desirable to provide methods and apparatuses for preparing upgraded pyrolysis oil that enable oxygen and other heteroatoms to be removed from a biomass-derived pyrolysis oil stream while minimizing degradation in fuel value that results from conventional hydrodeoxygenation techniques. Furthermore, other desirable features and characteristics of the present invention will become apparent from the subsequent detailed description of the invention and the appended claims, taken in conjunction with the accompanying drawings and this background of the invention.

BRIEF SUMMARY

Methods and apparatuses for preparing upgraded pyrolysis oil are provided herein. In an embodiment, a method of preparing upgraded pyrolysis oil includes providing a biomass-derived pyrolysis oil stream having an original oxygen content. The biomass-derived pyrolysis oil stream is hydrodeoxygenated under catalysis in the presence of hydrogen to form a hydrodeoxygenated pyrolysis oil stream comprising a cyclic paraffin component. At least a portion of the hydrodeoxygenated pyrolysis oil stream is dehydrogenated under catalysis to form the upgraded pyrolysis oil.

In another embodiment, a method of preparing upgraded pyrolysis oil includes pyrolyzing a biomass feed in a pyrolysis reactor to form a biomass-derived pyrolysis vapor stream. At least a portion of the biomass-derived pyrolysis vapor stream is condensed in a condensing system to form a biomass-derived pyrolysis oil stream having an original oxygen content. The biomass-derived pyrolysis oil stream is hydrodeoxygenated under catalysis in the presence of hydrogen to form a hydrodeoxygenated pyrolysis oil stream comprising a cyclic paraffin component. At least a portion of the hydrodeoxygenated pyrolysis oil stream having a molar ratio of cyclic paraffin compounds to aromatic compounds of at least 0.2:1 is dehydrogenated under catalysis and in the presence of a makeup hydrogen stream to form the upgraded pyrolysis oil and a recovered hydrogen stream. The recovered hydrogen stream is then used during hydrodeoxygenating.

In another embodiment, an apparatus for preparing upgraded pyrolysis oil includes a hydrodeoxygenating device for receiving a biomass-derived pyrolysis oil stream and for forming a hydrodeoxygenated pyrolysis oil stream comprising a cyclic paraffin component. A purification unit is in fluid communication with the hydrodeoxygenating device for receiving the hydrodeoxygenated pyrolysis oil stream and for separating a solids/aqueous component from the hydrodeoxygenated pyrolysis oil stream. A dehydrogenating device is in fluid communication with the hydrodeoxygenating device for receiving the hydrodeoxygenated pyrolysis oil stream and for forming the upgraded pyrolysis oil.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Provided herein are methods and apparatuses for preparing upgraded pyrolysis oil that enable oxygen and other heteroatoms to be removed from a biomass-derived pyrolysis oil stream by hydrodeoxygenating a biomass-derived pyrolysis oil stream while converting naphthenes, or cyclic paraffin compounds having one or more alkane rings that are formed during hydrodeoxygenation, to their corresponding aromatic compounds through dehydrogenation. Because the naphthenes have a lower octane value than their corresponding aromatic compounds, maximized fuel value for the upgraded pyrolysis oil can be obtained due to the removal of oxygen and other heteroatoms from the biomass-derived pyrolysis oil stream, and further due to the conversion of the naphthenes to their corresponding aromatic compounds.

Figure 1:
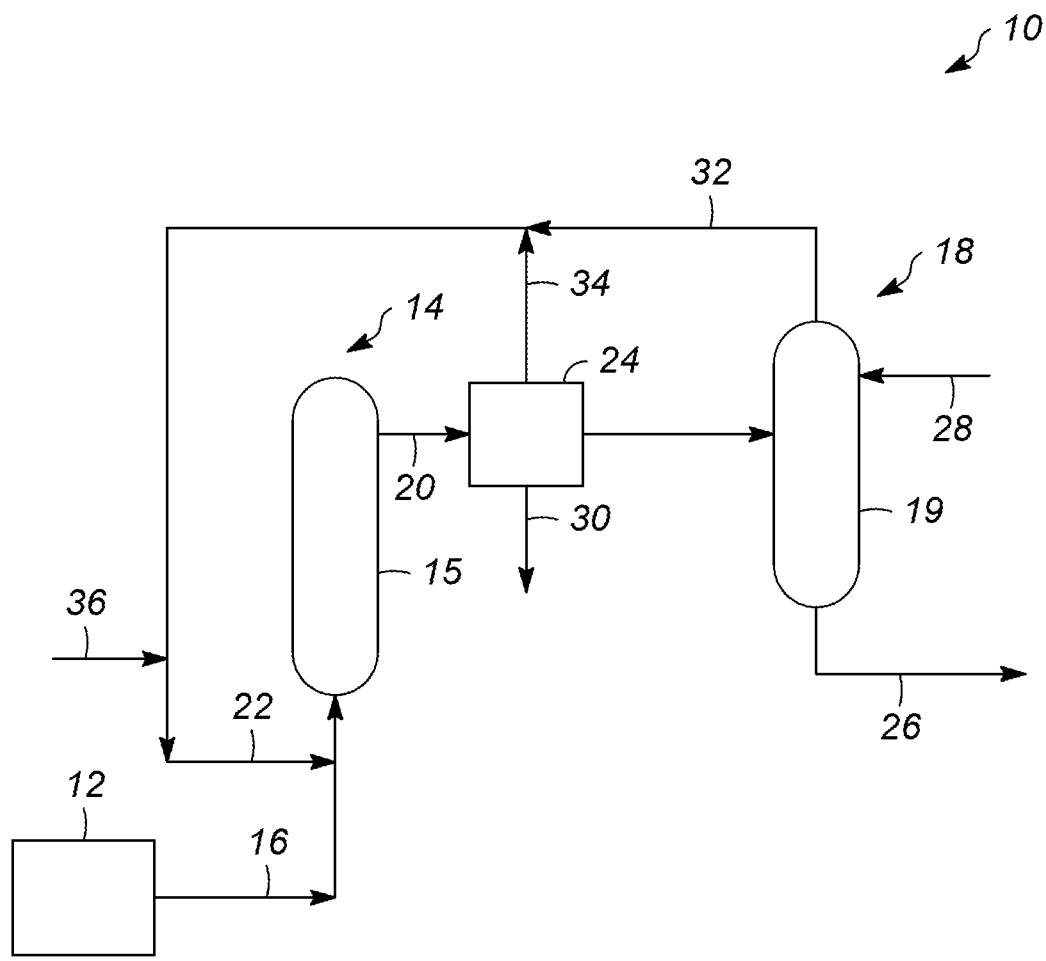
FIG. 1 is a schematic diagram of an apparatus and a method for preparing upgraded pyrolysis oil in accordance with an exemplary embodiment.

An exemplary embodiment of a method of preparing upgraded pyrolysis oil will now be addressed with reference to an exemplary apparatus 10 for preparing the upgraded pyrolysis oil as shown in FIG. 1. Referring to FIG. 1, the apparatus 10 includes a hydrodeoxygenating device 14, a purification unit 24 in fluid communication with the hydrodeoxygenating device 14, and a dehydrogenating device 18 in fluid communication with the purification unit 24. A pyrolysis oil supply 12 can be in fluid communication with the hydrodeoxygenating device 14. The exemplary method includes providing a biomass-derived pyrolysis oil stream 16. The biomass-derived pyrolysis oil stream 16 is a complex, organic liquid having an original oxygen content, and may also contain water. For example, the original oxygen content of the biomass-derived pyrolysis oil stream 16 can be from about 30 to about 60 weight %, such as from about 40 to about 55 weight %, based on the total weight of the biomass-derived pyrolysis oil stream 16. Water can be present in the biomass-derived pyrolysis oil stream 16 in an amount of from about 10 to about 35 weight %, such as from about 20 to about 32 weight %, based on the total weight of the biomass-derived pyrolysis oil stream 16. In this embodiment, the biomass-derived pyrolysis oil stream 16 is provided from the pyrolysis oil supply 12, which is not particularly limited and can be, for example, a vessel that contains biomass-derived pyrolysis oil or can be a pyrolyzing device.

The exemplary process continues with hydrodeoxygenating the biomass-derived pyrolysis oil stream 16 to form a hydrodeoxygenated pyrolysis oil stream 20 that includes a cyclic paraffin component. However, it is to be appreciated that other optional processing steps can be conducted on the biomass-derived pyrolysis oil stream 16 prior to hydrodeoxygenation, although such optional processing steps are not addressed herein. Hydrodeoxygenation removes gross amounts of heteroatoms such as sulfur, nitrogen, and oxygen, as well as other contaminants such as asphatenes, from the biomass-derived pyrolysis oil stream 16, thereby upgrading the fuel value thereof. Oxygen that is present in the biomass-derived pyrolysis oil stream 16 is generally present in the form of aromatic oxygenates. Hydrodeoxygenation cleaves the oxygen bond to the aromatic ring of the aromatic oxygenates, thereby forming water and carbon dioxide from the oxygen along with cyclic paraffin compounds. The resulting hydrodeoxygenated pyrolysis oil stream 20 includes the cyclic paraffin component. As referred to herein, the "cyclic paraffin component" includes any mono- or poly-cyclic paraffinic compounds that are present in the hydrodeoxygenated pyrolysis oil stream 20. The cyclic paraffin component generally includes cyclic paraffin compounds formed during hydrodeoxygenation, although it is to be appreciated that a portion of the cyclic paraffin component may be present in the biomass-derived pyrolysis oil stream 16 prior to hydrodeoxygenation. Molecules that do not include oxygen or other heteroatoms, such as alkylbenzenes and polyalkylbenzenes, are generally unaffected by hydrodeoxygenation.

The biomass-derived pyrolysis oil stream 16 can be hydrodeoxygenated in any conventional manner. In the exemplary embodiment of the process that is contemplated herein, the biomass-derived pyrolysis oil stream 16 is hydrodeoxygenated within the hydrodeoxygenating device 14 in a batch or semicontinuous or continuous process. Referring to FIG. 1, the hydrodeoxygenating device 14 includes a hydrodeoxygenating reactor 15. The hydrodeoxygenating reactor 15 includes one or more hydrodeoxygenation catalyst beds (not shown). In embodiments, the hydrodeoxygenating reactor 15 may be a continuous flow reactor, such as a fixed-bed reactor, a continuous stirred tank reactor (CSTR), a trickle bed reactor, an ebulliating bed reactor, a slurry reactor, or any other reactor known to those skilled in the art for hydrodeoxygenating. Although FIG. 1 shows the hydrodeoxygenating device 14 including a single hydrodeoxygenating reactor 15, it is to be appreciated that in other embodiments the hydrodeoxygenating device 14 may be a multi-stage hydrodeoxygenation system including multiple hydrodeoxygenating reactors.

Suitable hydrodeoxygenation catalysts that can be included in the one or more hydrodeoxygenation catalyst beds are known in the art and include, but are not limited to, those that contain at least one metal component chosen from non-noble Group VIII (CAS Notation) or at least one metal component selected from the Group VIB (CAS notation) elements or mixtures thereof. Group VIB elements include chromium, molybdenum and tungsten. Group VIII elements include iron, cobalt and nickel. The amount(s) of metal component(s) in the catalyst can range from about 0.1% to about 25% by weight of Group VIII metal component(s) and from about 0.1% to about 25% by weight of Group VIB metal component(s), calculated as metal oxide(s) per 100 parts by weight of total catalyst, where the percentages by weight are based on the weight of the catalyst. In one particular example, the hydrodeoxygenation catalyst comprises one or more components of nickel and/or cobalt and one or more components of molybdenum and/or tungsten. Additional metal or non-metal elements may be present in the catalyst. Such metals or non-metals elements include but aren't limited to sulfur, boron, phosphorus, alkali metals, and act as catalyst modifiers as known in the art.

Hydrodeoxygenating the biomass-derived pyrolysis oil stream 16 includes contacting the biomass-derived pyrolysis oil stream 16 with the hydrodeoxygenating catalyst in the presence of hydrogen. Generally, the biomass-derived pyrolysis oil stream 16 is in a partially vaporized state and is introduced into the hydrodeoxygenating reactor 15, where the biomass-derived pyrolysis oil stream 16 is contacted with the hydrodeoxygenation catalyst. Hydrodeoxygenating devices and processes for hydrodeoxygenating biomass-derived pyrolysis oil streams are known to one skilled in the art. Particular hydrodeoxygenating conditions that may be employed in the hydrodeoxygenating device 14 can include a temperature of the biomass-derived pyrolysis oil stream 16 immediately prior to hydrodeoxygenating. In an embodiment, temperature of the biomass-derived pyrolysis oil stream 16 can be increased by recycling a portion of the hydrodeoxygenated pyrolysis oil stream 20 in a recycle stream (not shown) and mixing the recycle stream with the biomass-derived pyrolysis oil stream 16 prior to hydrodeoxygenating. Without being bound by any particular theory, it is believed that mixing the recycle stream and biomass-derived pyrolysis oil stream 16 to increase the temperature of the biomass-derived pyrolysis oil stream 16 retards the rate of solids formation and solubilizes any solids that are formed prior to hydrodeoxygenating the mixed recycle stream and biomass-derived pyrolysis oil stream 16. Furthermore, the additional volume minimizes residence time, which results in minimized solids formation in the hydrodeoxygenated pyrolysis oil stream 20. For example, in an embodiment, the combined biomass-derived pyrolysis oil stream 16 and recycle stream has a temperature of about 150° C. or greater, for example from about 150 to about 400° C., such as from about 300 to about 375° C., prior to hydrodeoxygenating in the hydrodeoxygenating reactor 15. In an exemplary embodiment, the residence time is about 60 seconds or less, for example about 20 seconds or less, for example about 10 second or less, such as from about 10 to about 1 seconds. A liquid hourly space velocity of the combined biomass-derived pyrolysis oil stream 16 and recycle stream, on a basis of volume of the combined stream/volume of catalyst/hour ($hr^{-1}$), may be from about 0.5 to about 1 $hr^{-1}$. The hydrogen may be provided to the hydrodeoxygenating reactor 15 from a hydrogen-containing stream 22 at a treat rate of from about 1,000 to about 10,000 standard cubic feet per barrel (SCF/B), such as from about 4,000 to about 8,000 SCF/B. The hydrogen-containing stream 22 may be mixed with the biomass-derived pyrolysis oil stream 16 prior to hydrodeoxygenating the biomass-derived pyrolysis oil stream 16 in the hydrodeoxygenating reactor 15, as shown in FIG. 1, or may be separately introduced from the biomass-derived pyrolysis oil stream 16 concurrent with hydrodeoxygenating the biomass-derived pyrolysis oil stream 16 in the hydrodeoxygenating reactor 22.

Generally, during hydrodeoxygenating in the hydrodeoxygenating reactor 15, pressure in the hydrodeoxygenating reactor 15 can be in a range of from about 2 to about 20 MPa, such as from about 5 to about 8.5 Mpa, and temperature within the hydrodeoxygenating reactor 15 can be from about 150 to about 1000° C., such as from about 150 to about 750° C., for example from about 250 to about 400° C. In this regard, the biomass-derived pyrolysis oil stream 16 is hydrodeoxygenated in the hydrodeoxygenating reactor 15 at the above-referenced temperatures and pressures. In embodiments, the hydrodeoxygenated pyrolysis oil stream 20 is an intermediate hydrodeoxygenated pyrolysis oil stream between multiple hydrodeoxygenating devices in conventional multi-stage hydrodeoxygenating systems.

Residual oxygen content and cyclic paraffin content of the hydrodeoxygenated pyrolysis oil stream 20 is not particularly limited, although hydrodeoxygenated pyrolysis oil streams 20 having minimized residual oxygen content with attendant higher cyclic paraffin content benefit most from the methods described herein. Due to the hydrodeoxygenation of the biomass-derived pyrolysis oil stream 16, the residual oxygen content of the hydrodeoxygenated pyrolysis oil stream 20 is less than the original oxygen content of the biomass-derived pyrolysis oil stream 16. Residual oxygen content of the hydrodeoxygenated pyrolysis oil stream 20 is generally a function of the hydrodeoxygenating conditions referenced above, with more severe conditions, i.e., higher pressures and temperatures within the above ranges, leading to lower oxygen contents in the hydrodeoxygenated pyrolysis oil stream 20. The more severe conditions also lead to higher cyclic paraffin content in the hydrodeoxygenated pyrolysis oil stream 20. However, higher cyclic paraffin content in the hydrodeoxygenated pyrolysis oil stream 20 is remediated due to subsequent dehydrogenation of the hydrodeoxygenated pyrolysis oil stream 20, as described in further detail below, which converts cyclic paraffin compounds to their corresponding aromatic compounds. In an embodiment, the residual oxygen content of the hydrodeoxygenated pyrolysis oil stream 20 is from about 0.01 to about 10 weight %, such as from about 0.05 to about 1 weight %, based on the total weight of the hydrodeoxygenated pyrolysis oil stream 20. The cyclic paraffin content may be represented as a molar ratio of cyclic paraffin compounds to aromatic compounds in the hydrodeoxygenated pyrolysis oil stream 20. In an embodiment, the hydrodeoxygenated pyrolysis oil stream 20 has a molar ratio of cyclic paraffin compounds to aromatic compounds of at least 0.2:1, such as from about 0.2:1 to about 10:1, for example from about 1:1 to about 10:1.

In an exemplary embodiment of the process that is conducted in the apparatus 10 contemplated herein, a solids/aqueous component 30, which includes entrained hydrodeoxygenation catalyst as well as water from hydrodeoxygenating of the hydrodeoxygenated pyrolysis oil stream 20, is optionally separated from the hydrodeoxygenated pyrolysis oil stream 20 by feeding the hydrodeoxygenated pyrolysis oil stream 20 to the purification unit 24. Additionally, unreacted hydrogen 34 may be separated from the hydrodeoxygenated pyrolysis oil stream 20 in the purification unit 24 and recovered for recycle to the hydrodeoxygenating device 14, with additional hydrogen from other sources optionally supplementing the unreacted hydrogen 34 that is recycled to the hydrodeoxygenating device 14. In an alternative embodiment, no unreacted hydrogen 34 is supplied to the hydrodeoxygenating device 14 and hydrogen from other sources supplies all of the hydrogen necessary for hydrodeoxygenating the biomass-derived pyrolysis oil stream 16 in the hydrodeoxygenating device 14. The solids/aqueous component 30 may be treated to recover hydrodeoxygenation catalyst and to properly remediate water that is separated from the hydrodeoxygenated pyrolysis oil stream 20 through conventional techniques.

The process continues with dehydrogenating at least a portion of the hydrodeoxygenated pyrolysis oil stream 20 under catalysis to form an upgraded pyrolysis oil stream 26. In particular, cyclic paraffin compounds in at least the portion of the hydrodeoxygenated pyrolysis oil stream 20 are dehydrogenated under catalysis to form corresponding aromatic compounds, which have a higher octane value than the cyclic paraffin compounds and upgrade the fuel value of the resulting upgraded pyrolysis oil stream 26.

At least the portion of the hydrodeoxygenated pyrolysis oil stream 20 can be dehydrogenated in any conventional manner, and only some of or the entire hydrodeoxygenated pyrolysis oil stream 20 can be dehydrogenated. In the exemplary embodiment of the process that is contemplated herein, the hydrodeoxygenated pyrolysis oil stream 20 is dehydrogenated within the dehydrogenating device 18, in a batch or semicontinuous or continuous process. Referring to FIG. 1, the dehydrogenating device 18 includes a dehydrogenating reactor 19. The dehydrogenating reactor 19 includes one or more dehydrogenation catalyst beds (not shown). Although FIG. 1 shows the dehydrogenating device 18 including a single dehydrogenating reactor 19, it is to be appreciated that in other embodiments the dehydrogenating device 18 may be a multi-stage dehydrogenating system including multiple dehydrogenating reactors.

Suitable dehydrogenation catalysts that can be included in the one or more dehydrogenation catalyst beds are known in the art and include, but are not limited to, those that include halide functionality and a metal component on an inorganic oxide support. Suitable metals that may be present in the metal component include noble metals and/or base metals. Examples of suitable noble metals include those chosen from palladium, platinum, rhodium, ruthenium, osmium, iridium, and combinations thereof. Suitable base metals include those chosen from iron, nickel, lead, zinc, tin, rhenium, gallium, indium, and combinations thereof. In an embodiment, the metal component includes both a noble metal and a base metal, and the noble metal and base metal are each present in the dehydrogenation catalyst in an amount of from about 0.01 and about 5.0 weight percent, based upon the total weight of the dehydrogenation catalyst.

Suitable inorganic oxide supports can be chosen from alumina, titanium dioxide, zirconium dioxides, magnesia, silica-alumina, alumina-boria, and the like; crystalline aluminosilicates such as naturally occurring or synthetically prepared mordenite; or a combination of one or more of the aforementioned materials. The inorganic oxide supports may be further modified by doping with elements chosen from phosphorous, cerium, lithium, sodium, or potassium. Suitable inorganic oxide supports also have a surface area of at least 25 $m^2/g$, such as from about 25 to about 500 $m^2/g$.

The dehydrogenation catalyst may be formed by impregnating the inorganic oxide support with the metal component in the presence of a halide component, such as chloride. Methods of forming dehydrogenation catalysts are well known to those skilled in the art. A sufficient amount of the halide component is present in the dehydrogenation catalyst in an amount of from about 0.01 to about 2.5 weight %, such as from about 0.01 to about 1.4 weight %, for example from about 0.01 to less than or equal to about 0.5 weight %, based upon the total weight of the final dehydrogenation catalyst. One specific example of a suitable dehydrogenation catalyst includes 0.3 weight % platinum/0.6 weight % rhenium on a gamma alumina support with less than or equal to about 0.5 weight % chloride. Another specific example of a suitable dehydrogenation catalyst includes 0.3 weight % platinum/0.15 weight % rhenium on a theta alumina support with less than or equal to about 0.5 weight % chloride.

Dehydrogenating at least the portion of the hydrodeoxygenated pyrolysis oil stream 20 includes contacting at least the portion of the hydrodeoxygenated pyrolysis oil stream 20 with the dehydrogenation catalyst. Generally, the hydrodeoxygenated pyrolysis oil stream 20 is in a liquid state and at least the portion thereof is introduced into the dehydrogenating reactor 19, where at least the portion of the hydrodeoxygenated pyrolysis oil stream 20 is contacted with the dehydrogenation catalyst. Dehydrogenating devices and processes for hydrodeoxygenating biomass-derived pyrolysis oil streams 16 are well known to those skilled in the art. Particular dehydrogenation conditions that may be employed in the dehydrogenating device 18 can include a liquid hourly space velocity of at least the portion of the hydrodeoxygenated pyrolysis oil stream 20 of from about 0.01 to about 10, such as from about 0.75 to about 3.0 g feed/g catalyst/hour. Because dehydrogenation of at least the portion of the hydrodeoxygenated pyrolysis oil stream 20 is an endothermic process, one or more reheating stages (not shown) can be employed to reheat the dehydrogenation catalyst.

Generally, during dehydrogenation in the dehydrogenating reactor 19, pressure in the dehydrogenating reactor 19 can be in a range of from about 0.1 to about 3 MPa, such as from about 0.3 to about 1.0 MPa, and temperature within the dehydrogenating reactor 19 can be from about 200 to about 600° C., such as from about 350 to about 550° C., for example from about 450 to about 550° C. In this regard, at least the portion of the hydrodeoxygenated pyrolysis oil stream 20 is hydrodeoxygenated at the above-referenced temperatures and pressures.

While hydrodeoxygenated pyrolysis oil streams 20 having any amount of cyclic paraffin compounds can be dehydrogenated in the exemplary method contemplated herein, hydrodeoxygenated pyrolysis oil streams 20 that have a molar ratio of cycloparaffin compounds to aromatic compounds of at least 0.2:1, such as from about 0.2 to about 10:1, or from about 1:1 to about 10:1, may particularly benefit from the exemplary method and the method may include dehydrogenating at least the portion of the hydrodeoxygenated pyrolysis oil stream 20 that has the aforementioned molar ratio of cycloparaffin compounds to aromatic compounds. Dehydrogenation is most efficient at higher concentrations of cyclic paraffin compounds in the hydrodeoxygenated pyrolysis oil stream 20. Furthermore, hydrodeoxygenated pyrolysis oil streams 20 having ratios of cyclic paraffin compounds to aromatic compounds that are within the aforementioned ranges realize a more significant upgrading in fuel value when dehydrogenated than hydrodeoxygenated pyrolysis oil streams 20 having lesser ratios of cyclic paraffin compounds to aromatic compounds. Further still, with ratios of cyclic paraffin compounds to aromatic compounds in the hydrodeoxygenated pyrolysis oil stream 20 within the aforementioned ranges, dehydrogenation catalysts that have less halide content can be employed than when lesser ratios of cyclic paraffin compounds to aromatic compounds exist in the hydrodeoxygenated pyrolysis oil stream 20. For example, in an embodiment, the dehydrogenation catalyst has a halide content of less than 0.8 weight percent based upon the total weight of the dehydrogenation catalyst.

In an exemplary embodiment of the method contemplated herein, the portion of the hydrodeoxygenated pyrolysis oil stream 20 is dehydrogenated in the presence of a makeup hydrogen stream 28. Hydrogen from the makeup hydrogen stream 28 does not react during dehydrogenation of the hydrodeoxygenated pyrolysis oil stream 20 and is recovered in a recovered hydrogen stream 32 after dehydrogenation of the hydrodeoxygenated pyrolysis oil stream 20. The recovered hydrogen stream 32 is optionally used during hydrodeoxygenating of the biomass-derived pyrolysis oil stream 16, where hydrogen is a reactant. The presence of hydrogen from the makeup hydrogen stream 28 during dehydrogenation provides certain benefits to the method contemplated herein. For example, the presence of the hydrogen from the makeup hydrogen stream 28 may minimize dehydrogenation catalyst deactivation in the dehydrogenating reactor 19 during dehydrogenation. Further, by dehydrogenating the portion of the hydrodeoxygenated pyrolysis oil stream 20 in the presence of the makeup hydrogen stream 28, it may be possible to eliminate a need for a recycle gas compressor for the recovered hydrogen stream 32 that is recovered from the dehydrogenating reactor 19. When employed, the makeup hydrogen stream 28 may be provided at rate of from about greater than 0 to about 8 mol H2/mol hydrodeoxygenated pyrolysis oil stream that is dehydrogenated, such as from about 0.05 to about 1 mol H2/mol hydrodeoxygenated pyrolysis oil stream, for example from about 0.05 to about 0.2 mol H2/mol hydrodeoxygenated pyrolysis oil stream.

Dehydrogenation of at least the portion of the hydrodeoxygenated pyrolysis oil stream 20 forms the upgraded pyrolysis oil stream 26, which has a lower molar ratio of cyclic paraffin compounds to aromatic compounds than the hydrodeoxygenated pyrolysis oil stream 20. Additionally, hydrogen is produced through dehydrogenation of at least the portion of the hydrodeoxygenated pyrolysis oil stream 20. The hydrogen produced through dehydrogenation may be recovered along with the hydrogen from the makeup hydrogen stream 28 (when the makeup hydrogen stream 28 is provided) in the recovered hydrogen stream 32. The molar ratio of cyclic paraffin compounds to aromatic compounds in the upgraded pyrolysis oil stream 26 is generally a function of the dehydrogenation conditions and the initial molar ratio of cyclic paraffin compounds to aromatic compounds in the hydrodeoxygenated pyrolysis oil stream 20. In an embodiment, the molar ratio of cyclic paraffin compounds to aromatic compounds in the upgraded pyrolysis oil stream 26 is from about 0.01:1 to about 2:1, such as from about 0.05:1 to about 1:1.

In an exemplary embodiment and as shown in FIG. 1, the recovered hydrogen stream 32 is used during hydrodeoxygenating of the biomass-derived pyrolysis oil stream 16 and the recovered hydrogen stream 32 is combined with unreacted hydrogen 34 that is separated from the hydrodeoxygenated pyrolysis oil stream 20. Additional fresh hydrogen 36 may also be combined with the recovered hydrogen stream 32 and unreacted hydrogen 34, as needed, to provide the hydrogen-containing stream 22 that is ultimately provided to the hydrodeoxygenating reactor 15.

Figure 2:
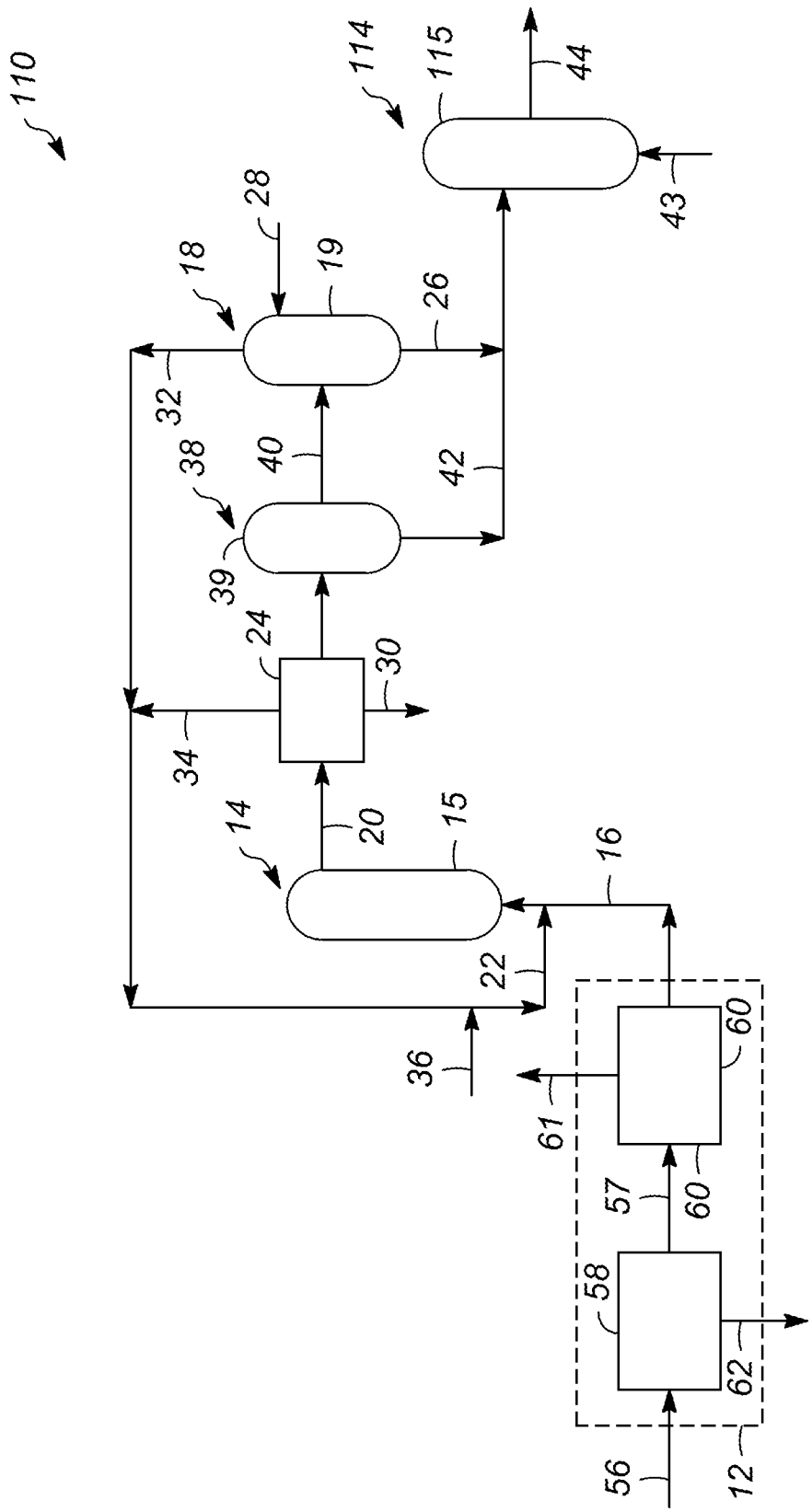
FIG. 2 is a schematic diagram of an apparatus and a process for preparing upgraded pyrolysis oil in accordance with another exemplary embodiment.

An exemplary embodiment of a method for preparing upgraded pyrolysis oil will now be addressed with reference to an exemplary apparatus 110 as shown in FIG. 2. In the embodiment of the apparatus 110 shown in FIG. 2, the apparatus 110 includes the same features as the apparatus 10 shown in FIG. 1, and additionally includes a pyrolysis reactor 58 and a condensing system 60, which may together be characterized as the pyrolysis oil supply 12 as described above in the context of the apparatus 10 of FIG. 1. The exemplary apparatus 110 of FIG. 2 also includes a separation device 38 disposed between the purification unit 24 and the dehydrogenating device 18. In accordance with the exemplary process of this embodiment, a biomass feed 56 is pyrolyzed in the pyrolysis reactor 58 to form a biomass-derived pyrolysis vapor stream 57. As known in the art, pyrolysis is a thermochemical decomposition of organic material at elevated temperatures without the participation of oxygen. In this regard, pyrolysis is typically performed substantially in the absence of molecular oxygen, e.g., in the absence of air, as known in the art, although the presence of oxygen cannot be completely eliminated and some oxygen is typically present. The biomass-derived pyrolysis vapor stream 57 may be obtained by different pyrolysis processes, such as, but not limited to, fast pyrolysis, vacuum pyrolysis, catalytic pyrolysis, and slow pyrolysis (also known as carbonization). Fast pyrolysis, in particular, is a process during which organic biomass, such as wood waste, agricultural waste, etc., is rapidly heated to about 450° C. to about 600° C. in the absence of air. Under these conditions, the biomass-derived pyrolysis vapor stream 57 is produced in the pyrolysis reactor 58, along with char 62 (which includes ash and combustible hydrocarbon solids). The char 62 is expelled from the pyrolysis reactor 58 and disposed of or remediated through conventional treatments. The biomass-derived pyrolysis vapor stream 57 includes organic vapors, water vapor, and pyrolysis gases. At least a portion of the biomass-derived pyrolysis vapor stream 57 is condensed in the condensing system 60 to form the biomass-derived pyrolysis oil stream 16 having an original oxygen content, with uncondensed gases 61 expelled from the condensing system 60 and remediated through conventional treatments.

The exemplary process continues with hydrodeoxygenating the biomass-derived pyrolysis oil stream 16 to produce the hydrodeoxygenated pyrolysis oil stream 20 in the same manner as described above in the context of the exemplary process conducted in the apparatus 10 if FIG. 1. At least a portion of the hydrodeoxygenated pyrolysis oil stream 20 is then dehydrogenated in the same manner as described above in the context of the exemplary process conducted in the apparatus 10 of FIG. 1. However, prior to dehydrogenating at least the portion of the hydrodeoxygenated pyrolysis oil stream 20, the method of this embodiment includes separating the hydrodeoxygenated pyrolysis oil stream 20 into at least two streams in the separation device 38. To explain, fuel value requirements of the upgraded pyrolysis oil stream 26 may not necessarily require the entire hydrodeoxygenated pyrolysis oil stream 20 to be dehydrogenated. Under such circumstances, the separation device 38 may be a valve or splitter 39 that diverts a portion 40 of the hydrodeoxygenated pyrolysis oil stream 20 to the dehydrogenating device 18 for dehydrogenation, with a remaining portion 42 of the hydrodeoxygenated pyrolysis oil stream 20 bypassing the dehydrogenating device 18. The upgraded pyrolysis oil stream 26 formed through dehydrogenation may be mixed with the remaining portion 42 of the hydrodeoxygenated pyrolysis oil stream 20 that bypasses the dehydrogenating device 18 after dehydrogenating the portion 40 of the hydrodeoxygenated pyrolysis oil stream 20.

In another exemplary embodiment, the separation device 38 is at least one fractionation column 39 that fractionates the hydrodeoxygenated pyrolysis oil stream 20 into a cyclic paraffin-rich stream 40 and a cyclic paraffin-depleted stream 42. The cyclic paraffin-rich stream 40 is then dehydrogenated in the dehydrogenating device 18, and the cyclic paraffin-depleted stream 42 bypasses the dehydrogenating device 18. The upgraded pyrolysis oil stream 26 formed through dehydrogenation of the cyclic paraffin-rich stream 40 may be mixed with the cyclic paraffin-depleted stream 42 that bypasses the dehydrogenating device 18 after dehydrogenating the cyclic paraffin-rich stream 40. In this embodiment, the hydrodeoxygenated pyrolysis oil stream 20 may initially have a ratio of cycloparaffin compounds to aromatic compounds of less than 0.2:1, with separation of the hydrodeoxygenated pyrolysis oil stream 20 in the fractionation column 39 producing the cyclic paraffin-rich stream 40 having a ratio of cycloparaffin compounds to aromatic compounds of greater than 0.2:1. In this regard, at least the portion 40 of the hydrodeoxygenated pyrolysis oil stream 20 that is dehydrogenated can be concentrated and the size of the dehydrogenating device 18 can be minimized.

In an exemplary embodiment, after dehydrogenating at least the portion of the hydrodeoxygenated pyrolysis oil stream 20 to form the upgraded pyrolysis oil stream 26, the upgraded pyrolysis oil stream 26 along with the remaining portion 42 of the hydrodeoxygenated pyrolysis oil stream 20 that is mixed therewith is additionally hydrodeoxygenated in an additional hydrodeoxygenating device 114. The additional hydrodeoxygenating device 114 includes an additional hydrodeoxygenating reactor 115, and the hydrodeoxygenated pyrolysis oil stream 20 is additionally hydrodeoxygenated in the presence of additional hydrogen 43 to form an additionally upgraded pyrolysis oil stream 44. In this embodiment, the hydrodeoxygenated pyrolysis oil stream 20 that is dehydrogenated may be an intermediate stream in a multi-stage hydrodeoxygenation system and dehydrogenation is conducted as an intermediate step prior to complete hydrodeoxygenation of the biomass-derived pyrolysis oil stream 16. Although not shown, the additionally upgraded pyrolysis oil stream 26 may also be additionally dehydrogenated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of preparing upgraded pyrolysis oil, the method comprising the steps of:
   providing a biomass-derived pyrolysis oil stream having an original oxygen content;
   hydrodeoxygenating the biomass-derived pyrolysis oil stream under catalysis in the presence of hydrogen to form a hydrodeoxygenated pyrolysis oil stream comprising a cyclic paraffin component;
   dehydrogenating at least a portion of the hydrodeoxygenated pyrolysis oil stream under catalysis to form an upgraded pyrolysis oil stream.

2. The method of claim 1, wherein the step of dehydrogenating comprises dehydrogenating at least the portion of the hydrodeoxygenated pyrolysis oil stream having a molar ratio of cyclic paraffin compounds to aromatic compounds of at least 0.2:1.

3. The method of claim 1, further comprising the step of separating the hydrodeoxygenated pyrolysis oil stream into at least two streams, and wherein the step of dehydrogenating comprises dehydrogenating one of the at least two streams.

4. The method of claim 3, wherein the step of separating comprises fractionating the hydrodeoxygenated pyrolysis oil stream into a cyclic paraffin-rich stream and a cyclic paraffin-depleted stream, and wherein the step of dehydrogenating one of the at least two streams is further defined as dehydrogenating the cyclic paraffin-rich stream.

5. The method of claim 4, wherein the cyclic paraffin-depleted stream has a molar ratio of cyclic paraffin compounds to aromatic compounds of less than 0.2:1, and wherein the cyclic paraffin-depleted stream bypasses the step of dehydrogenating at least the portion of the hydrodeoxygenated pyrolysis oil stream.

6. The method of claim 1, wherein the step of providing the biomass-derived pyrolysis oil stream comprises pyrolyzing a biomass feed in a pyrolysis reactor to form a biomass-derived pyrolysis vapor stream.

7. The method of claim 6, wherein the step of providing the biomass-derived pyrolysis oil stream further comprises condensing at least a portion of the biomass-derived pyrolysis vapor stream in a condensing system to form the biomass-derived pyrolysis oil stream having the original oxygen content.

8. The method of claim 1, wherein at least the portion of the hydrodeoxygenated pyrolysis oil stream is dehydrogenated in the presence of a makeup hydrogen stream.

9. The method of claim 1, wherein dehydrogenating further forms a recovered hydrogen stream, and wherein the recovered hydrogen stream is used during hydrodeoxygenating the biomass-derived pyrolysis oil stream.

10. The method of claim 1, further comprising the step of additionally hydrodeoxygenating the upgraded pyrolysis oil stream.

11. The method of claim 1, wherein the biomass-derived pyrolysis oil stream is hydrodeoxygenated at a temperature of from about 150 to about 1000° C. and a pressure of from about 0 to about 14 MPa.

12. The method of claim 1, wherein at least the portion of the hydrodeoxygenated pyrolysis oil stream is dehydrogenated at a temperature of from about 200 to about 600° C. and a pressure of from about 0.1 to about 3 MPa.

13. The method of claim 1, wherein at least the portion of the hydrodeoxygenated pyrolysis oil stream is dehydrogenated in the presence of a dehydrogenation catalyst comprising halide functionality and a metal component on an inorganic oxide support.

14. The method of claim 13, wherein at least the portion of the hydrodeoxygenated pyrolysis oil stream is dehydrogenated in the presence of the dehydrogenation catalyst having a halide content of less than 0.8 weight percent based upon the total weight of the dehydrogenation catalyst.

15. A method of preparing upgraded pyrolysis oil, the method comprising the steps of:
   pyrolyzing a biomass feed in a pyrolysis reactor to form a biomass-derived pyrolysis vapor stream;
   condensing at least a portion of the biomass-derived pyrolysis vapor stream in a condensing system to form a biomass-derived pyrolysis oil stream having an original oxygen content;
   hydrodeoxygenating the biomass-derived pyrolysis oil stream under catalysis in the presence of hydrogen to form a hydrodeoxygenated pyrolysis oil stream comprising a cyclic paraffin component;
   dehydrogenating at least a portion of the hydrodeoxygenated pyrolysis oil stream having a molar ratio of cyclic paraffin compounds to aromatic compounds of at least 0.2:1 under catalysis and in the presence of a makeup hydrogen stream to form an upgraded pyrolysis oil stream and a recovered hydrogen stream; and
   using the recovered hydrogen stream during the hydrodeoxygenating step.

16. The method of claim 15, further comprising the step of separating the hydrodeoxygenated pyrolysis oil stream into at least two streams in a separation device, and wherein the step of dehydrogenating at least the portion of the hydrodeoxygenated pyrolysis oil stream is further defined as dehydrogenating one of the at least two streams.

17. The method of claim 16, wherein the separation device is further defined as a fractionation column, wherein the step of separating the hydrodeoxygenated pyrolysis oil stream is further defined as fractionating the hydrodeoxygenated pyrolysis oil stream into a cyclic paraffin-rich stream and a cyclic paraffin-depleted stream in at least one fractionation column, and wherein the step of dehydrogenating one of the at least two streams is further defined as dehydrogenating the cyclic paraffin-rich stream.

18. The method of claim 15, further comprising the step of separating a solids/aqueous component from the hydrodeoxygenated pyrolysis oil stream prior to dehydrogenating the hydrodeoxygenated pyrolysis oil stream.

19. The method of claim 15, further comprising the step of additionally hydrodeoxygenating the upgraded pyrolysis oil stream.

* * * * *